April 22, 1930.   L. M. WOOLSON   1,755,942
INTERNAL COMBUSTION ENGINE
Filed April 14, 1924   6 Sheets-Sheet 2
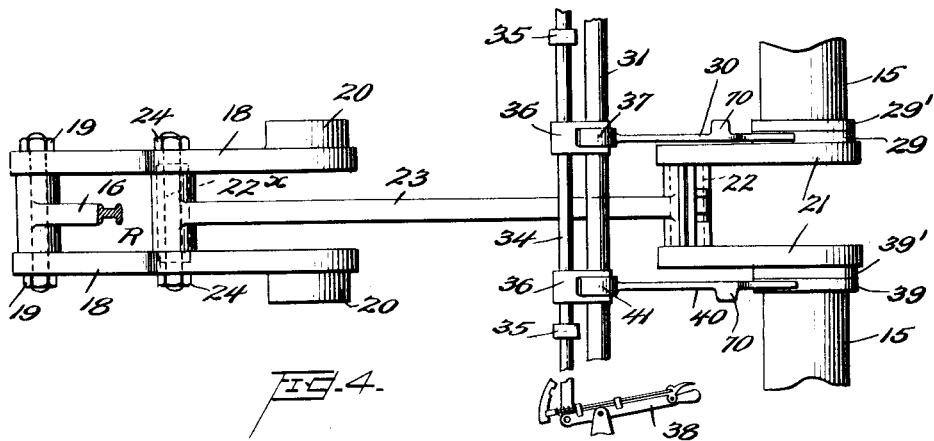
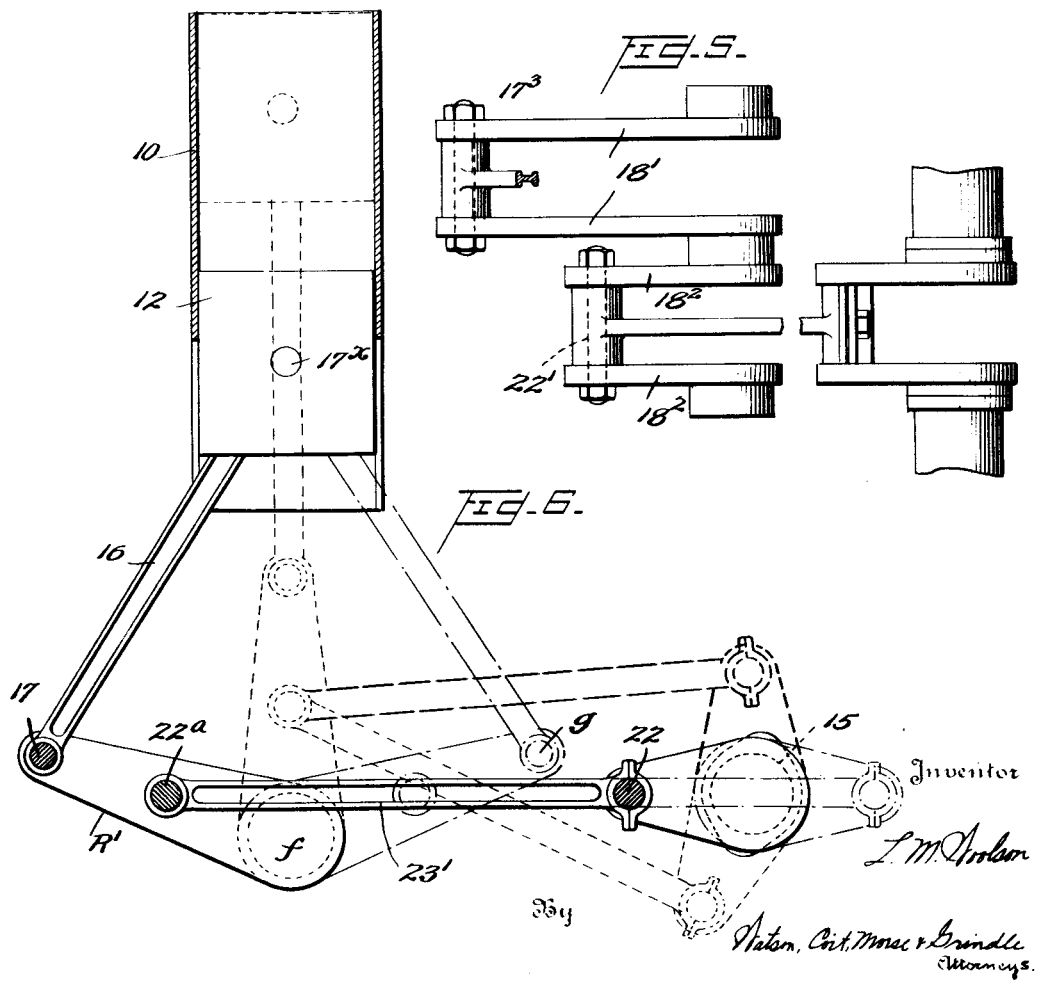

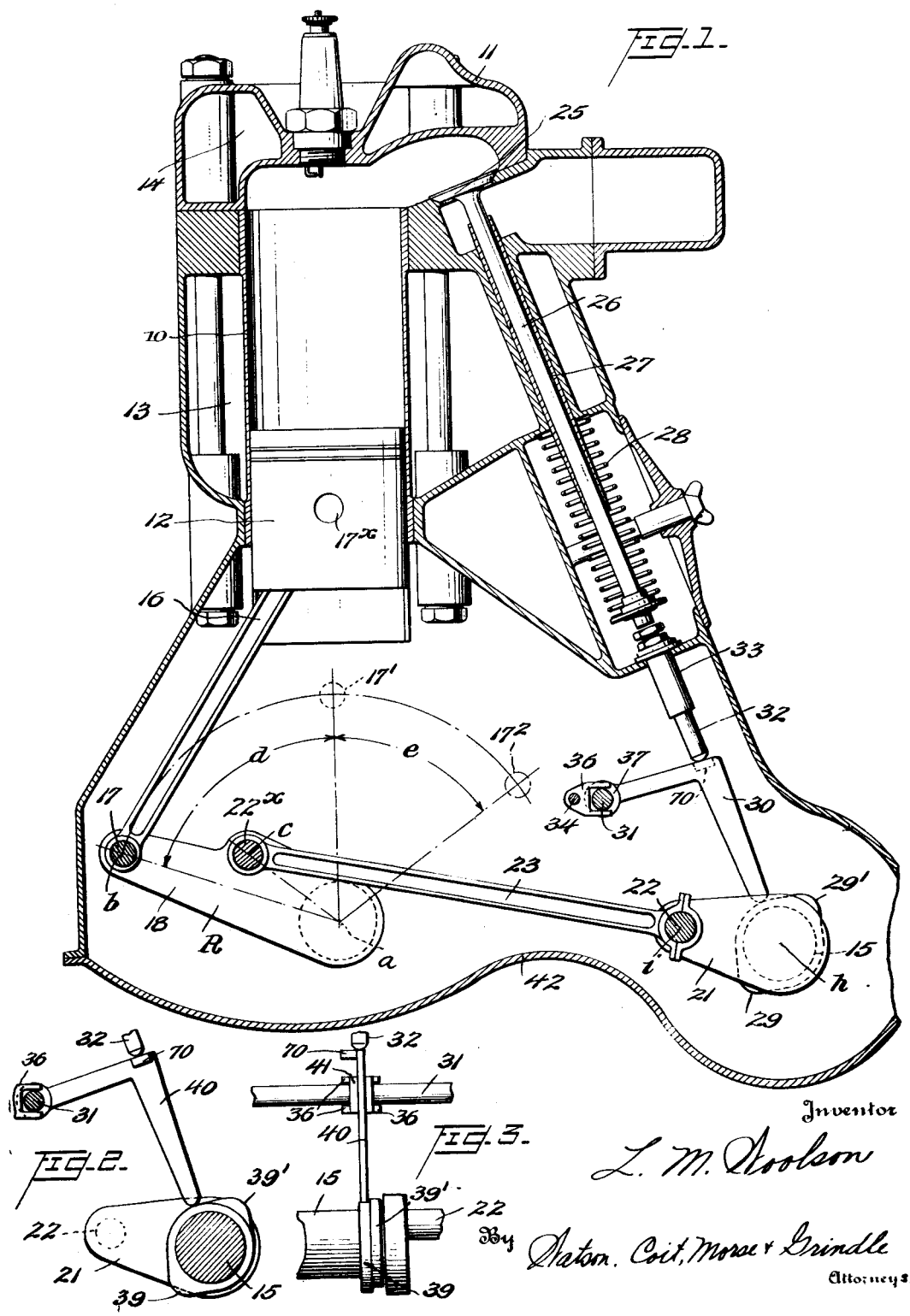

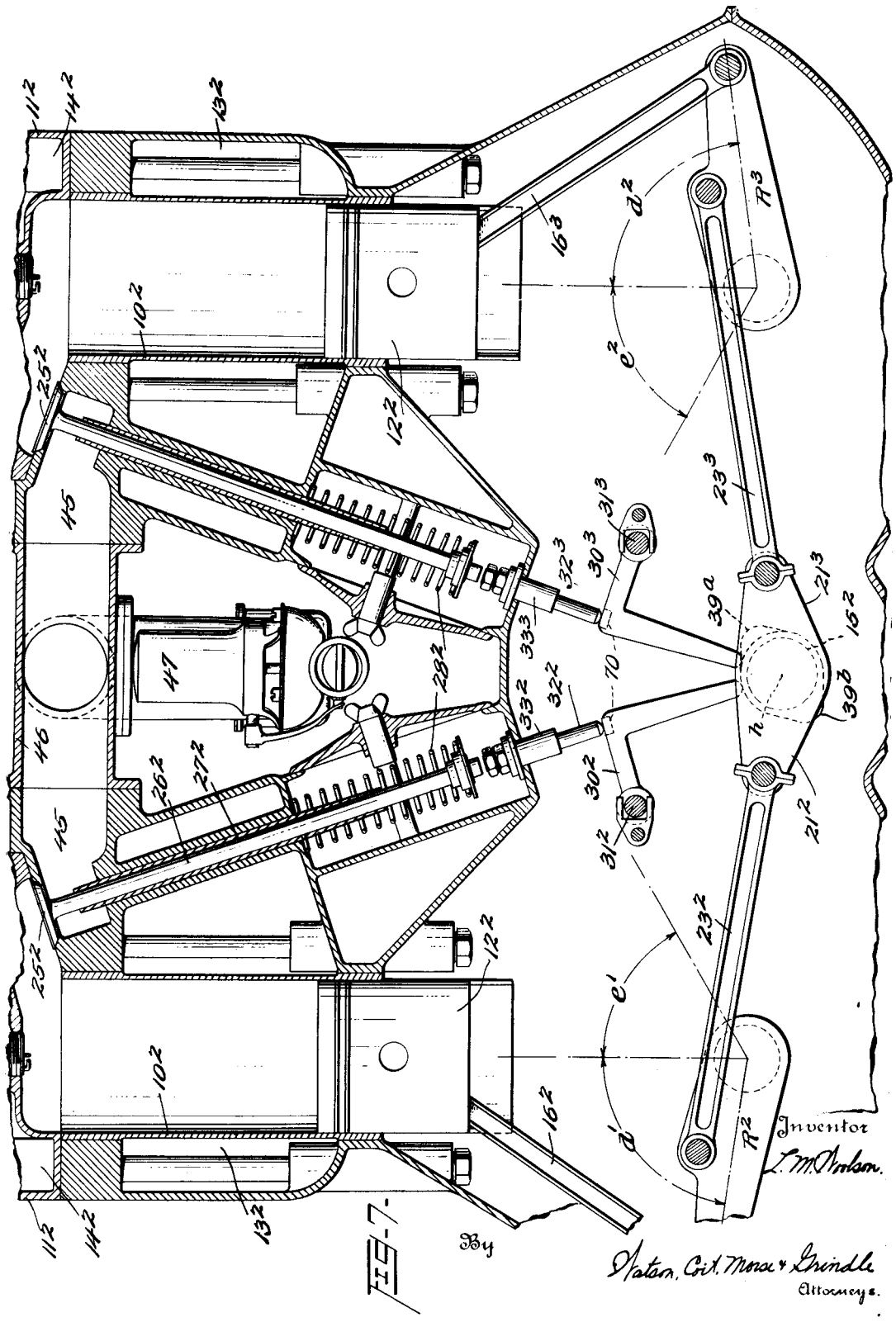

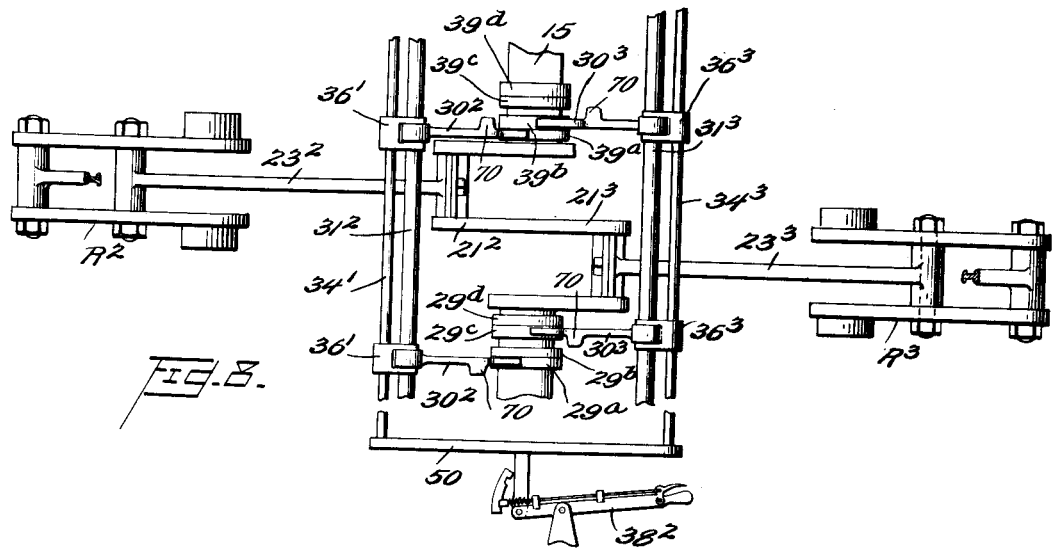
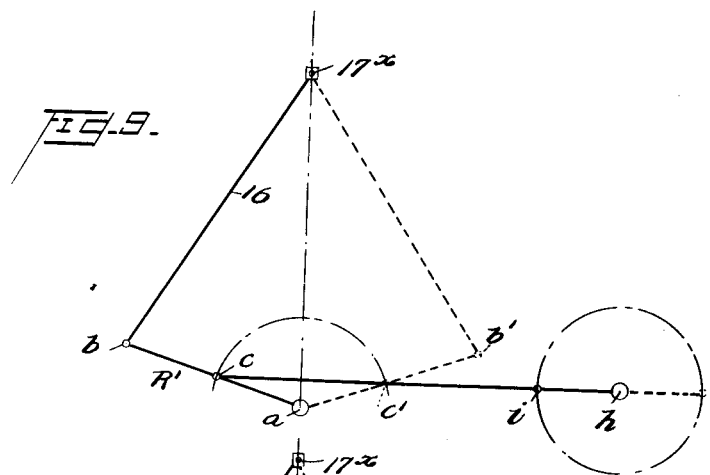
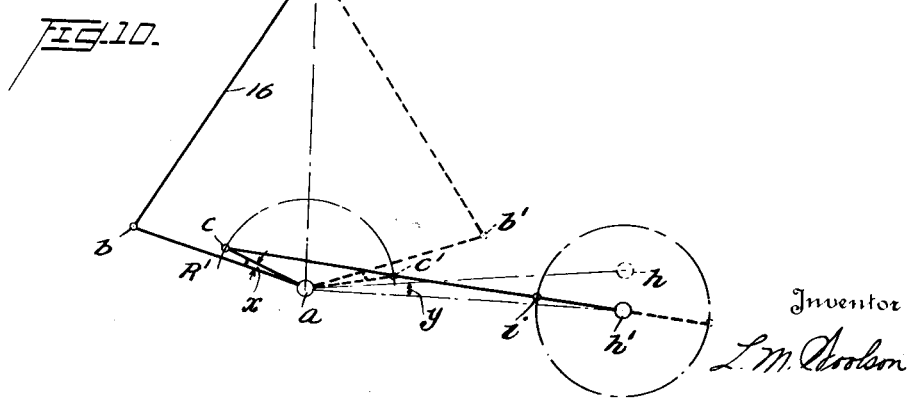

April 22, 1930.  L. M. WOOLSON  1,755,942
INTERNAL COMBUSTION ENGINE
Filed April 14, 1924   6 Sheets-Sheet 5
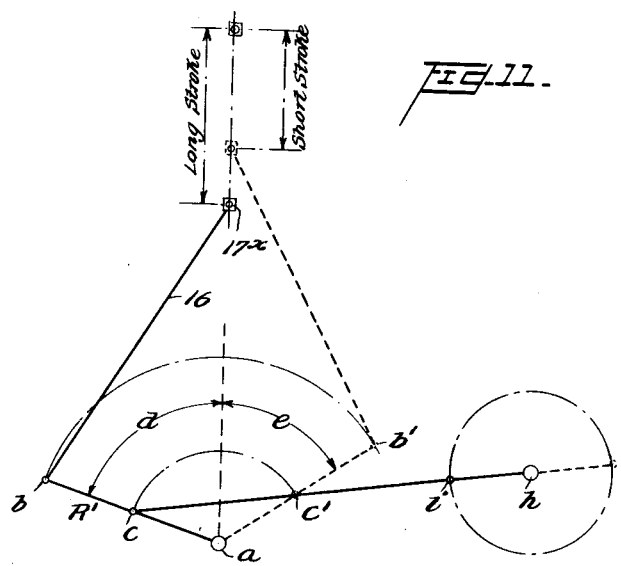
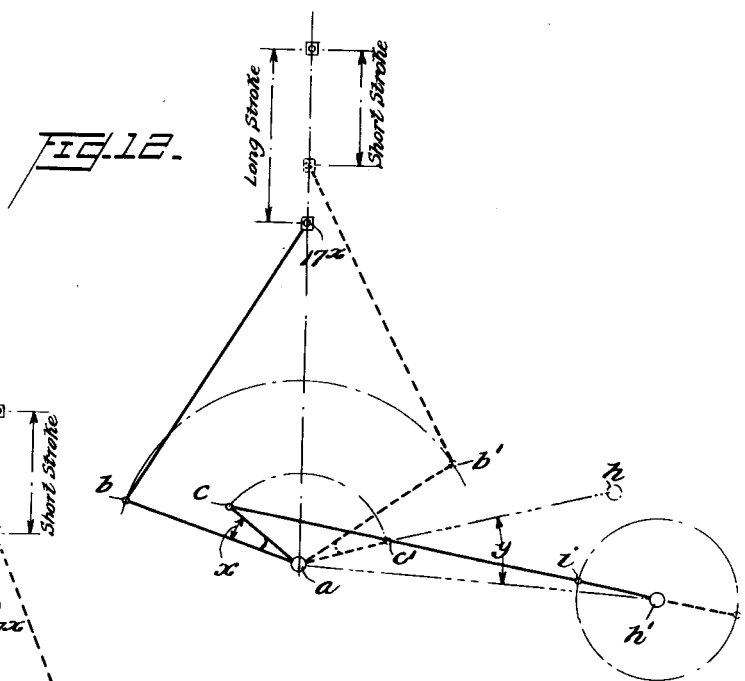
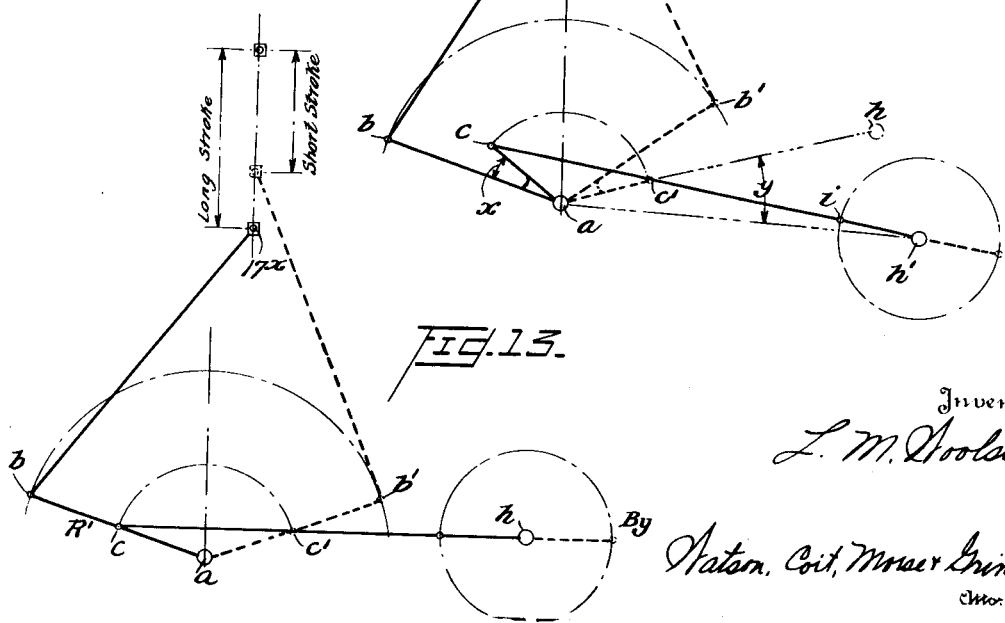
Inventor
L. M. Woolson
By Watson, Coit, Morse & Grindle
Attorneys April 22, 1930.                L. M. WOOLSON                1,755,942
                        INTERNAL COMBUSTION ENGINE
                          Filed April 14, 1924         6 Sheets-Sheet 6
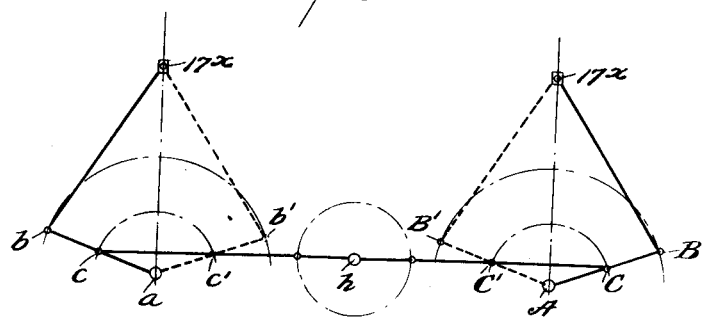
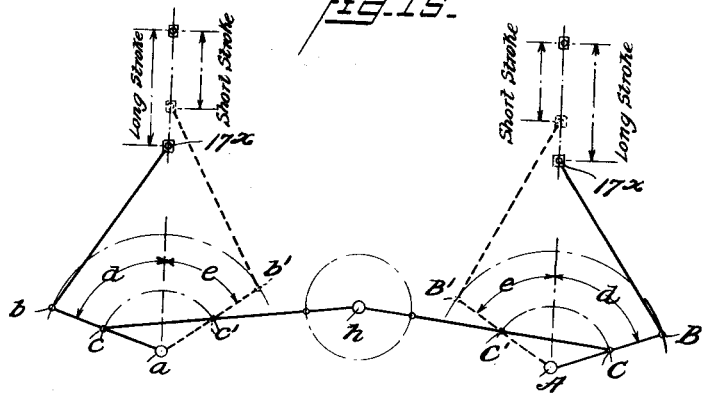
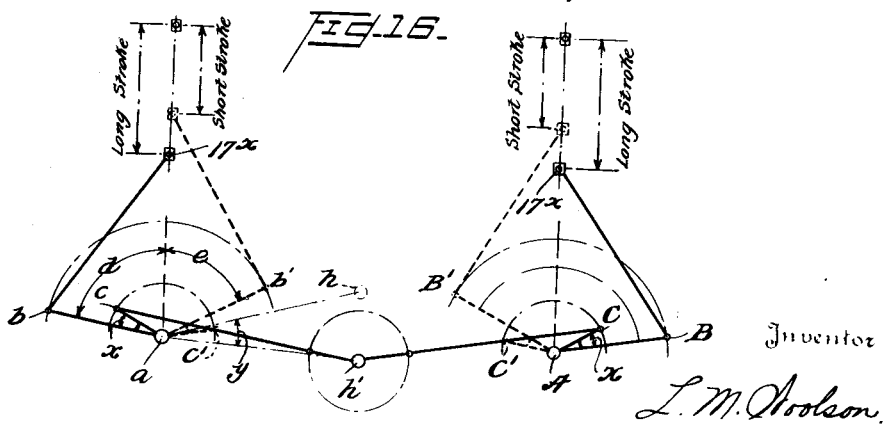
Inventor
L. M. Woolson.
By Watson, Coit, Morse & Grindle
                              Attorneys Patented Apr. 22, 1930

1,755,942

UNITED STATES PATENT OFFICE

LIONEL M. WOOLSON, OF DETROIT, MICHIGAN, ASSIGNOR TO PACKARD MOTOR CAR COMPANY, OF DETROIT. MICHIGAN, A CORPORATION OF MICHIGAN

INTERNAL-COMBUSTION ENGINE

Application filed April 14, 1924. Serial No. 706,602.

The present invention relates to internal combustion engines or motors.

The invention is an improvement upon the engine of the Atkinson Patent No. 367,496, dated August 2, 1887, in which engine the piston makes four strokes for one complete revolution of the crank shaft. Thus a motor operating on the four-cycle principle will have the crank shaft making one revolution for one complete cycle of operations of the motor as distinguished from the usual four cycle motors of today, wherein the crank shaft makes two complete revolutions for one complete cycle of operations of the motor.

One of the objects of the invention is the provision of valves for controlling the inlet and exhaust of gases to the cylinder, of whatever type, which may be operated directly from the crank shaft, instead of a shaft independent of the crank shaft. This construction eliminates the so-called cam shaft and the gearing connecting the crank shaft and cam shaft. Of course as this gearing and cam shaft are eliminated the motor operates much quieter and necessarily has a longer life.

Another object of the invention is to provide a transmission mechanism connecting the piston and crank shaft such that the diameter of the crank pin circle may be made any desired dimension and preferably less than the stroke of the piston. In other words, the transmission mechanism is such that the throw of the crank shaft is entirely independent of the stroke of the piston. Consequently the diameter of the throw may be reduced considerably as compared to crank shafts of the present type of motors, with the result that an extremely rigid shaft may be obtained, or if a shaft as rigid as the present day shafts is preferred, then less weight is required.

The motor may be provided with valves of any desired type, that is to say, poppet valves, single sleeve valves, double sleeve valves, or rotary sleeve valves. In any case, these valves may be operated directly from a moving part of the transmission mechanism without gears or chains. If a motor with poppet valves is employed, then the cams for actuating the poppet valves may be directly carried by the crank shaft. If other types of valves are employed, then a suitable actuating means may be operated directly by the crank shaft or another moving part of the transmission mechanism.

Another object of the invention is to provide a motor with novel means for obtaining strokes of different lengths. The suction stroke may be longer than the power or firing stroke or the firing stroke may be longer than the suction stroke. If maximum power is desired then a long suction stroke and short power stroke will be employed. On the other hand, if maximum thermal efficiency is sought, then a long power stroke and short suction stroke will be used.

Another object of the invention is to provide a motor with novel means that may be adjusted to operate the motor on the one hand with a long suction stroke and short power stroke, or on the other hand, with a long power stroke and short suction stroke, the first adjustment giving maximum power and the second adjustment, maximum thermal efficiency. This adjustment may be conviently effected by providing the motor with two sets of valve actuating mechanisms and shifting from one to the other, one mechanism being suitable for opearting the motor with a long suction stroke and short power stroke, and the other mechanism being suitable to operate the motor with a long power stroke and short suction stroke.

Another object of the invention is to provide a four cycle motor of the Atkinson type with means whereby the difference in length of strokes may be all at one end, as for instance, at the end remote from the cylinder head. In such case the clearance is the same at the end of the compression and exhaust strokes and enough exhaust gas may thereby be retained to properly heat and dilute the incoming charge.

Other objects and features of novelty will be apparent from the description taken in connection with the drawings, in which:—

Figure 1 is a sectional elevation through a motor constructed in accordance with the present invention;

Figure 2 is a sectional view of a detail of the valve operating device;

Figure 3 is an elevation of the details shown in Figure 2;

Figure 4 is a plan view of a portion of the transmission mechanism between the piston and crank shaft, certain parts being shown in section;

Figure 5 is a view similar to Figure 4 showing a modified form of the same portion of the transmission mechanism;

Figure 6 is a sectional elevation showing a modification of the motor illustrated in Figure 1;

Figure 7 is a sectional elevation through another form of the invention wherein two parallel spaced cylinder blocks are employed with a single crank shaft;

Figure 8 is a plan view of a portion of the transmission mechanism employed with the motor illustrated in Figure 7;

Figure 9 is a diagrammatic view illustrating one of the simplest forms of the invention, this form being the one shown in Figure 6;

Figure 10 shows a modification of the motor illustrated in Figure 9, the crank shaft in Figure 10 being differently located from that in Figure 9;

Figure 11 is another diagrammatic view illustrating one embodiment of the invention, wherein the piston reciprocates with strokes of different lengths, there being alternatively a pair of long and short strokes;

Figure 12 shows a form of the invention similar to that illustrated in Figure 11 except that the crank shaft is differently located;

Figure 13 diagrammatically illustrates another arrangement whereby strokes of different lengths may be obtained;

Figure 14 diagrammatically illustrates a motor similar to that shown in Figure 7, but operating with strokes all of the same lengths;

Figure 15 diagrammatically shows an arrangement somewhat similar to that shown in Figure 7, the difference being that the long and short arms of the rockers are parallel. In this form of the invention the motor has strokes of different lengths.

Figure 16 is a diagrammatic illustration of the motor illustrated in Figure 7.

Referring to the drawings, and more particularly to the form of the invention illustrated in Figures 1 to 4 inclusive, the numeral 10 indicates the cylinder of the engine or motor. As shown, this motor has the usual detachable head 11, piston 12, and water jackets indicated at 13 and 14. The parts thus far described may be of any desired construction.

One of the novel features of the invention resides in the means for connecting the piston 12 and the crank shaft 15. This transmission mechanism is designed so that the piston makes four complete strokes for one complete revolution of the crank shaft. With an engine operating on the four-stroke cycle, therefore, the crank shaft makes one complete revolution for each complete cycle of the engine. With the usual four-stroke cycle engine of today, the crank shaft makes two revolutions for each complete cycle of the engine.

In the form illustrated in these figures the transmission mechanism includes a rocker R, mounted to oscillate back and forth about an axis $a$, parallel to the axis of the crank shaft 15. As shown, the rocker R comprises two arms of different lengths, the long arm being indicated at $ab$ and the short arm at $ac$. In this embodiment of the invention, these two arms are joined into a single integral piece, but in cases where the two arms $ab$ and $ac$ are separated through a greater angle, it might not be convenient to form them as shown.

The rocker R and piston 12 are connected by a pitman 16, the upper end of the pitman having the usual wrist pin connection $17^x$ with the piston. The lower end is pivotally mounted on a pin 17. As shown in Figure 4, the rocker R may comprise spaced cheeks 18 between which the pin 17 is clamped by means of nuts 19 screwed on the ends thereof. The inner or pivotal ends of the cheeks 18 forming the rocker may be provided with trunnions 20 for pivotally supporting the entire rocker.

The crank shaft 15 is provided with a crank throw $hi$ comprising cheeks 21 and crank pin 22 connecting the same. This crank pin 22 is connected with the pin $22^x$ at the end of the short arm $ac$ of the rocker by means of a link 23. In the form shown, the pin $22^x$ is clamped between the cheeks 18 of the rocker R and is so held by the nuts 24 threaded on the ends of the pin. The crank $hi$ is shorter than the rocker arm $ac$ so that the rocker R will oscillate only as the shaft 15 rotates.

When the rocker R swings pin 17 from the position shown in Figure 1 to the position $17'$, the piston makes an up-stroke and when it swings it from this position to position $17^2$, the piston makes a down-stroke. Here, the rocker reverses, and in swinging back to the full line position shown in Figure 1, causes the piston to make first an up-stroke and then a down-stroke. During this time, that is to say, while the rocker has swung to the right and back to its original position, the crank shaft 15 has made one complete revolution. In other words, the piston has made four complete strokes while the crank shaft has made only one revolution.

It will be noted that the angle $d$ through which the rocker swings to the left of the vertical line through axis $a$ of the rocker, is greater than the angle $e$ through which it swings to the right of said vertical line. Consequently the pair of strokes of the piston corresponding to the swing of the rocker through angle $d$ will be longer than the pair of strokes corresponding to the swing of the rocker back and forth through angle $e$. In other words, for every four strokes of the piston, two will be longer than two others, that is, the piston alternately makes two long strokes and two short strokes. Advantage may be taken of this fact to have the motor operate either at a maximum thermal efficiency or to give maximum power. For maximum thermal efficiency it is desirable that the power stroke be a long stroke. On the other hand, for maximum power it is desirable that the suction stroke be a long stroke. With the motor of the present invention, the power stroke may be made either long or short and the suction stroke may be made either long or short. Furthermore, if desired, the motor may be provided with means so that it may be adjusted to operate with a long power stroke or a short power stroke combined with a short suction stroke or a long suction stroke, respectively. This brings us to a description of the valve operating mechanism, a very important feature of the invention.

Inasmuch as the motor is of the four-cycle type and the crank shaft makes one revolution for a complete cycle of operations of the motor, the valves may be operated directly from the crank shaft or associated parts.

In the form of the invention illustrated, the motor is shown as being provided with poppet valves, one of which is illustrated at 25. This valve has the usual stem 26 reciprocating in a guide-way 27 and held to its seat by the well known spring mechanism illustrated at 28. For the purpose of opening and closing these valves any suitable means may be provided on the crank shaft. As shown, the crank shaft is provided with a cam 29 which actuates a follower 30 pivoted on a shaft 31. This follower operates a valve tappet 32 slidably mounted in a sleeve 33, the upper end of the tappet being adapted to engage the lower end of the valve stem and thus operate the valve. As previously stated, the motor may have its power stroke a long or a short stroke. If it is desired to operate the motor at maximum thermal efficiency, then the suction stroke will be short and the power stroke long. By reversal of cam 29, however, I could cause the motor to operate with the suction stroke a long stroke and the power stroke a short stroke giving maximum power. In the drawings one means for effecting this result is shown. Thus the crank shaft 15 is provided with a second cam, indicated at 29', this latter cam being substantially reversed with respect to first mentioned cam 29. Means is provided so that either cam may be effective to operate the valve. Thus as shown, the follower 30 may be slidably mounted on its supporting shaft 31. Means is provided for shifting this follower from one cam to the other. As shown, a rod 34 is slidably mounted in bearings 35 and carries a fork 36 engaging on opposite sides of the hub 37 of the follower 30. Any suitable means, such as a lever 38, is provided for adjusting the rod 34, whereby the follower 30 may be moved from one cam 29 to the other cam 29', and thus change the operation of the motor. As shown in Figure 4, the crank shaft is also provided with a cam 39 for operating the follower 40, which in turn actuates the inlet valve of the cylinder. This follower 40, in the same manner, may be shifted to another cam 39' by a fork 36 engaging its hub 41 simultaneously with the movement of the exhaust valve follower 30.

Of course the rocker R, crank shaft, and associated parts are properly housed, as by means of a casing 42 which corresponds to the usual crank casing of a hydrocarbon motor. If desired, the motor may comprise a series of cylinders disposed parallel to the cylinder 10 and in line therewith. In this case there would be a single crank shaft having throws, one for each cylinder. The rockers, however, would be independent, that is to say, the rocker for one cylinder would not be connected to the rocker for another cylinder.

In Figure 5 an arrangement of the rocker and crank shaft is shown, wherein the short arm of the rocker is displaced axially from the long arm. The long arm of the rocker comprises the cheeks 18' and pin $17^3$. The short arm consists of the cheeks $18^2$ and pin 22'.

Where poppet or similar valves are employed, as shown in Figure 1, it will be noted that the stems of the valves are inclined to the axis of the cylinder. This disposes the valves in the combustion chamber so that the most efficient action is obtained. The extent of the inclination of the valves will vary with the distance of the axis of the crank shaft from the axis of the cylinder.

The diameter of the crank pin circle (the circle described by the axis of the crank pin 22) is less than the length of a stroke of the piston, indeed, it is entirely independent of said stroke, since the latter depends on the length of the arm $ab$ of the rocker and the angle through which said arm swings. Hence, for a motor of given stroke, a more rigid or stronger crank shaft may be used without increased weight as compared with the usual motors, or a shaft of less weight may be used and yet be as rigid and strong as the shafts of the usual motors. Of course the cost of a crank shaft having a small throw is less than one having a greater throw.

As the piston makes four strokes for one revolution of the crank shaft, the average speed of the piston is substantially twice that in the usual motors, but with the exception of the piston and pitman, the other parts move at the usual speeds and produce no greater inertia or unbalanced forces.

As there is a power stroke for each revolution of the crank shaft, the displacement of the piston may be one-half of that in the usual motors. Moreover, higher compression pressures may be employed without departing from the principle of single point ignition, and without causing premature ignition or detonation. Because of this high compression pressure, the economy and efficiency of the motor will be increased as compared with the usual motors.

Figure 6 illustrates a modification of the invention wherein the strokes are all of equal length and the long and short arms of the rocker are parallel. In this form the piston 12 reciprocates in the cylinder 10 and the wrist pin $17^x$ of the piston is connected to the pin 17 of the long arm of the rocker R' by means of the pitman 16. The pin $22^a$ of the short arm of the rocker is connected to the crank pin 22 of the crank shaft 15 by a link 23'. The rocker swings from the position shown in full lines to a position indicated by the line $fg$ in Figure 6. It will be noted that it thus swings through equal angles on opposite sides of the vertical line through the axis of the rocker. An extension of the line through the two positions of the axis of the short arm pin $22^a$ corresponding to the two extreme positions of the rocker, intersects the axis of the crank shaft. This form of the invention is diagrammatically illustrated in Figure 9 of the drawings.

Figure 7 illustrates a form of the invention wherein two motors like that shown in Figure 1 are combined side by side, but with a single crank shaft. As shown, the motor comprises two cylinders $10^2$ or blocks of cylinders having the usual detachable heads $11^2$, pistons $12^2$, and water jackets $13^2$ for the cylinders and $14^2$ for the cylinder heads. As shown, the cylinders or cylinder blocks are parallel and spaced, the crank shaft $15^2$ being disposed between the cylinders and preferably somewhat below the same. The admission and exhaust to the cylinders are controlled by valves of any suitable type, poppet valves being illustrated. In Figure 7, the inlet valves $25^2$ only are shown, these valves having stems $26^2$ slidably mounted in bushings $27^2$ carried by the cylinder castings. The valves are normally held to their seats in the usual manner, as by the springs $28^2$. The inlet valves $25^2$ control the admission of the mixture from inlet chambers 45, these chambers being connected to a conduit 46 in communication with a carburetor 47, disposed between the two cylinder castings.

Each piston $12^2$ is connected to the crank shaft in such manner that the piston makes four complete strokes for one revolution of the crank shaft. This means for connecting the piston and crank shaft is the same as illustrated in Figure 1. For the left hand connection, as shown at Figure 7, the rocker $R^2$ is connected to the piston by a connecting rod $16^2$ and the short arm of the rocker is connected to a crank $21^2$ of the crank shaft by a link $23^2$.

Similarly, the right hand piston $12^3$ is connected to the crank shaft. As shown the right hand piston $12^3$ and rocker $R^3$ are connected by a pitman $16^3$ and the rocker $R^3$ and crank $21^3$ on the crank shaft $15^2$ are connected by a link $23^3$. Where each cylinder casting comprises a plurality of cylinders, the rockers for each cylinder are independent, that is to say, the rocker of one cylinder is not connected to the rocker of the next or any other cylinder.

The valves of the motor are actuated directly from the crank shaft. As poppet valves are shown in Figure 7, the crank shaft is provided with cams for actuating these valves, two axially spaced cams $39^a$ and $39^b$ being shown in Figure 7. The valves are raised by the cams acting on the pivoted followers $30^2$ and $30^3$, these followers being pivotally mounted on shafts $31^2$ and $31^3$. The followers act on the valve tappets $32^2$ and $32^3$ slidably mounted in the sleeves $33^2$ and $33^3$.

The arrangement of the parts is such that the piston of each cylinder is caused to make a pair of long strokes followed by a pair of short strokes. As previously explained, this results from the fact that the rockers swing unequal angles on each side of the vertical and the pitman is directly pivoted to its rocker. Thus the left hand rocker shown at Figure 7, swings to the left through an angle $d'$ and to the right of the vertical through an angle $e'$, the latter angle being less than the former. Consequently the strokes of the piston are of unequal lengths. Similarly, the right hand rocker from the vertical swings to the right through an angle $d^2$ and to the left through an angle $e^2$, the latter being smaller than the former angle. The motor can be timed so that it operates with a long suction stroke and short power stroke or with a short suction stroke and a long power stroke. As previously explained, one method of accomplishing this is to provide two sets of cams and means for actuating the motor, selectively, from either set of cams. Thus, as shown in Figure 8, the motor of Figure 7 has its crank shaft provided with two complete sets of cams. The pair of inlet cams for the left hand cylinder are shown at $39^a$ and $39^b$. The pair of inlet cams for the right hand cylinder are shown at $39^c$ and $39^d$. Likewise the pairs of exhaust cams for the left hand cylinder are shown at $29^a$ and $29^b$ and the pair of exhaust cams for the right hand cylinder at $29^c$ and $29^d$. Means similar to that explained in connection with the form of the invention illustrated in Figures 1 and 4 are provided for shifting the followers $30^2$ and $30^3$ from one cam to the other of each pair. Thus, as shown, the slidably mounted rod $34'$ carries a plurality of forks $36'$, one for each follower $30^2$, adapted to engage the hub of each of these followers and when the rod is shifted to move the followers $30^2$ from one to the other of the pair of cams with which it is adapted to cooperate. Likewise, for the followers 30³ a slidable rod 34³ is provided carrying a fork 36³ for each of the followers 30³, adapted to engage the hub thereof and when the rod is shifted to move the follower from one to the other of the pair of cams with which it is adapted to cooperate. In order that the shiftable rods 34′ and 34³ may move, simultaneously, they are connected by a cross bar 50, which in turn is connected to an actuating lever 38². When the lever 38² is swung, the cam followers will then be shifted from one set of cams to the other. In this manner the engine may be adjusted to operate with long suction strokes and short power strokes on the one hand or short suction strokes and long power strokes on the other.

In order that the valve tappets 32, 32² and 33³ shall rest on a follower regardless of the shifting movement of the latter, each follower 30, 30², 30³, and 40 has a lateral lug 70 for this purpose.

To give a better understanding of how the invention may be embodied in many different arrangements, reference may be had to the diagrammatic Figures 9 to 16 inclusive.

As previously explained, Figure 9 is a diagrammatic illustration of the form of the invention shown in Figure 6. In this arrangement, the axis of the rocker R′ is indicated at $a$. The long arm of the rocker is $ab$ and the short arm $ac$. The pitman is indicated at 16 and the axis of the wrist pin in the piston at 17.

The axis $a$ of the rocker is in line with the axis of the piston and the rocker R′ swings equal angles to the right and left of the vertical line through the axis of the rocker. The positions of the axes $b$ and $c$ when at the right hand end of the swing are shown at $b'$ and $c'$ respectively. The trace of the axis $h$ of the crank shaft preferably lies on the line through the points $c$ and $c'$.

Figure 10 shows a modification of the arrangement described in Figure 9, the difference consisting in locating the trace of the axis $h$ of the crank shaft at some point that does not lie on the line $cc'$ extended, of Figure 9.

In this Figure 10, the short arm $ac$ of the rocker has been swung through an angle $x$ equal to the angle $y$ through which the axis $h$ of the crank shaft has swung about axis $a$, in going from the position of Figure 9 to that of Figure 10.

Figure 11 illustrates one arrangement of parts for obtaining a pair of long followed by a pair of short strokes. The axis $a$ of the rocker R′ is in line with the axis of the piston. The short arm $ac$ of the rocker is parallel to the long arm $ab$, but the arrangement of the parts is such that the rocker swings through a greater angle $d$ to the left of the vertical than it does to the right of the vertical, the latter angle being indicated at $e$. The trace of the axis of the crank shaft preferably lies on the line $cc'$ extended, the point $c'$ indicating the position of the pivot at the outer end of the short arm when said arm is at the right hand end of its movement.

Figure 12 illustrates the mechanism of Figure 11, but with the axis of the crank shaft in a different position. The axis of the crank shaft has been moved to a point $h'$ having swung through an angle $y$ about the axis $a$ of the rocker. In order to get the proper action of the parts, the short arm $ac$ of the rocker must also be swung through an angle, $x$, equal to the angle $y$, with respect to the long arm $ab$ of the rocker. In other words, in order that the crank shall turn through the same angle for each stroke of the piston, the trace of the crank shaft axis must lie on the line $cc'$ of Figure 9, or if the axis of the crank shaft is moved either way from this position, then the short arm of the rocker must be moved through an angle the same as the angle through which the axis of the crank shaft has been swung about the axis $a$ of the rocker.

Figure 13 illustrates another arrangement of the mechanism for securing a pair of long strokes followed by a pair of short strokes. In this arrangement the axis $a$ of the rocker is disposed at one side of the line of reciprocation of the piston and the rocker swings through equal angles on both sides of the vertical line through the axis $a$ of the rocker. The trace of the axis $h$ of the crank shaft preferably lies on the line $cc'$ extended. With this arrangement a pair of long strokes will be obtained followed by a pair of short strokes.

Figure 14 illustrates diagrammatically a motor like that shown in Figure 7 but in its simplest form. In this arrangement, a pair of mechanisms like that shown in Figure 9 are disposed side by side but with a single crank shaft only. The rocker at the left comprises a long arm $ab$ and a short cam $ac$, and the rocker at the right consists of a long arm AB and short arm AC. The trace of the axis $h$ of the crank shaft preferably lies at the intersection of the lines through the points $cc'$ and CC′.

Figure 15 illustrates a modification of Figure 14, wherein the strokes of the pistons are of different lengths, there being alternately a pair of long strokes and a pair of short strokes. For this purpose, the rockers swing through unequal angles on opposite sides of the vertical line through the axes of the rockers. Thus the rockers swing through an angle $d$ to one side of the vertical and angle $e$ to the other side, these angles being unequal. The trace of the axis $h$ of the crank shaft is preferably located at the intersection of the lines $cc'$ and CC′.

Figure 16 is a diagrammatic illustration of the form of the invention illustrated in Figure 7, this form being a modification of that shown in Figure 15, the difference consisting in that the axis of the crank shaft has been moved from the position shown in Figure 15 to a new position $h'$, having been swung through an angle $y$ about either $a$ or $A$. In order to continue to have the crank shaft rotate through equal angles for all strokes of the piston, the short arms $ac$ and $AC$ of the rockers have also been swung through an angle $x$ equal to the angle $y$.

It is thought that these diagrammatic figures explain the invention sufficiently so that the principles thereof may be fully understood. Other modifications and changes will be apparent from these figures and the description.

Having thus described the invention what is claimed as new and desired to be secured by Letters Patent is:

1. In an internal combustion motor of the four-cycle type in combination, a reciprocating member, a rotatably mounted shaft having a crank, means connecting the crank and member, whereby the member makes four single strokes for each complete revolution of said shaft, including a rocker comprising two arms, a pitman connecting the member and one arm, and a link connecting the crank and the other arm, the parts being arranged so that the pivotal connection of the pitman and its arm swings back and forth across a line through the center of oscillation of the rocker parallel to the reciprocating member.

2. In an internal combustion motor of the four-cycle type in combination, a reciprocating member, a rotatably mounted shaft having a crank, means connecting the crank and piston, whereby the piston makes four single strokes for each complete revolution of said shaft, including a rocker comprising two non-parallel arms of different lengths, a pitman connecting the member and long arm, and a link connecting the crank and short arm, the parts being arranged so that the pivotal connection of the pitman and long arm swings back and forth across a line through the center of oscillation of the rocker parallel to the reciprocating member.

3. In an internal combustion motor of the four-cycle type, in combination, a piston, a crank shaft, and gearless means connecting said piston and crank shaft to rotate the shaft through 360° while the piston is making four single strokes, the diameter of the crank pin circle being less than the length of a single stroke of the piston.

4. In an internal combustion motor of the four-cycle type, in combination, a piston, a crank shaft, and a linkage connecting the piston and crank shaft to rotate the crank shaft through 360° for each four single strokes of said piston, the diameter of the crank pin circle being less than the length of a single stroke of said piston.

5. In an internal combustion motor of the four-cycle type, in combination, a piston, a crank shaft, and means connecting said piston and crank shaft to rotate said shaft through 360° for each four strokes of said piston, said means including a rocker mounted to swing back and forth across a line through its center of oscillation and parallel to the path of said piston, the diameter of the crank pin circle being less than the length of a single stroke of said piston.

6. In an internal combustion motor of the four-cycle type, in combination, a piston, a crank shaft, and means connecting said piston and crank shaft to rotate the shaft through 360° for each four single strokes of said piston, said means including a rocker mounted to swing back and forth across a line through its center of oscillation and parallel to the path of said piston and also including means connecting said rocker and crank shaft to convert a complete oscillation of said rocker into a complete revolution of said crank shaft, the diameter of the crank pin circle being less than the length of a single stroke of said piston.

7. In an internal combustion motor of the four-cycle type, in combination, a piston, a rotatably mounted crank shaft, a rocker, a pitman connecting said rocker and piston, and a link connecting said rocker and the crank of said shaft, the parts being mounted so that the pivotal connection of the pitman and rocker swings back and forth across a line through the center of oscillation of the rocker and parallel to the path of the piston, the diameter of the crank pin circle being less than the length of a single stroke of said piston.

8. In an internal combustion motor of the four-cycle type, in combination, a piston, a rotatably mounted crank shaft, a rocker having two non-parallel arms of different lengths, a pitman connecting the long arm and said piston, and a link connecting the short arm and the crank of said shaft, the parts being disposed so that the pivotal connection of the pitman and long arm swings back and forth across a line through the center of oscillation of said rocker parallel to the path of said piston.

9. In an internal combustion motor of the four-cycle type, in combination, a piston, a rotatably mounted crank shaft, a rocker having two non-parallel arms of different lengths, a pitman connecting the long arm and said piston, and a link connecting the short arm and the crank of said shaft, the parts being disposed so that the pivotal connection of the pitman and long arm swings back and forth across a line through the center of oscillation of said rocker parallel to the path of said piston, the diameter of the crank pin circle being less than the length of a single stroke of said piston.

10. In an internal combustion motor of the four-cycle type, in combination, a piston, a rotatably mounted crank shaft, a rocker having two non-parallel arms of different lengths, a pitman connecting the long arm and said piston, and a link connecting the short arm and the crank of said shaft, the parts being disposed so that the pivotal connection of the pitman and long arm swings back and forth across a line through the center of oscillation of said rocker parallel to the path of said piston, the axis of said crank shaft intersecting a line through the two end positions of the axis of the bearing at the end of the short arm of said rocker.

11. In an internal combustion motor of the four-cycle type, in combination, two cylinders, pistons slidably mounted therein, a crank shaft rotatably mounted between said cylinders and having two cranks, a rocker having two non-parallel arms, one being longer that the other, a pitman connecting one piston and the long arm of said rocker, a link connecting one crank and the short arm of said rocker, the arrangement being such that the crank shaft makes one complete revolution while said piston makes four single strokes, and similar mechanism connecting the other piston and the other crank.

12. In an internal combustion motor of the four-cycle type, in combination, a reciprocating piston, a rotatably mounted shaft, a rocker, and means comprising a pitman and a link connecting said piston and rocker and said shaft and rocker to rotate said shaft through 360° while the piston is making four single strokes, the relative arrangement of piston, rocker and shaft being such that the piston alternately makes two long strokes and two short strokes.

13. In an internal combustion motor of the four-cycle type, in combination, a slidably mounted piston, a rotatably mounted shaft, means for converting four single strokes of said piston into one complete revolution of said shaft, said strokes being alternately two long and two short, and means to selectively operate the motor with a long stroke either a firing stroke or a suction stroke.

14. In an internal combustion motor of the four-cycle type, in combination, a slidably mounted piston, a rotatably mounted shaft, means for converting four single strokes of said piston into one complete revolution of said shaft, said strokes being alternately two long and two short, and means to selectively operate the motor with a short suction stroke and a long firing stroke on the one hand or a long suction stroke and a short firing stroke on the other hand.

15. In an internal combustion motor of the four-cycle type, in combination, a slidably mounted piston, a rotatably mounted shaft, means for converting four single strokes of said piston into one complete revolution of said shaft, said strokes being alternately two long and two short, and means to selectively operate the motor with either a short or a long suction stroke.

16. In an internal combustion motor of the four-cycle type, in combination, a slidably mounted piston, a rotatably mounted shaft, means for converting four single strokes of said piston into one complete revolution of said shaft, said strokes being alternately two long and two short, and means to selectively operate the motor with either a short or a long firing stroke.

17. In an internal combustion motor of the four-cycle type, in combination, a reciprocating piston, a rotatably mounted shaft, a rocker, and means connecting said piston and rocker and said shaft and rocker to rotate said shaft through 360° while the piston is making four single strokes, the relative arrangement of piston, rocker and shaft being such that the piston alternately makes two long strokes and two short strokes, the suction stroke being longer than the firing stroke.

18. In an internal combustion motor of the four-cycle type, in combination, a reciprocating piston, a rotatably mounted shaft, a rocker, means connecting said piston and rocker and said shaft and rocker to rotate said shaft through 360° while the piston is making four single strokes, the arrangement being such that the piston alternately makes two long strokes and two short strokes, and means to selectively operate the motor with a long stroke either a suction or firing stroke.

19. In an internal combustion motor of the four-cycle type, in combination, a reciprocating piston, a rotatably mounted shaft, a rocker, means connecting said piston and rocker and said shaft and rocker to rotate said shaft through 360° while the piston is making four single strokes, the arrangement being such that the piston alternately makes two long strokes and two short strokes, and means to selectively operate the motor with either a short or long suction stroke.

20. In an internal combustion motor of the four-cycle type, in combination, a reciprocating piston, a rotatably mounted shaft, a rocker, means connecting said piston and rocker and said shaft and rocker to rotate said shaft through 360° while the piston is making four single strokes, the arrangement being such that the piston alternately makes two long strokes and two short strokes, and means to selectively operate the motor with either a short or long firing stroke.

21. In an internal combustion motor of the four-cycle type, in combination, a reciprocating piston, a rotatably mounted shaft, a rocker, means connecting said piston and rocker and said shaft and rocker to rotate said shaft through 360° while the piston is making four single strokes, the arrangement being such that the piston alternately makes two long strokes and two short strokes, and means to selectively operate the motor with a short suction stroke and long firing stroke on the one hand and a long suction stroke and a short firing stroke on the other hand.

22. In an internal combustion motor of the four-cycle type, in combination, a slidably mounted piston, valves for controlling the admission and exhaust to the motor, a rotatably mounted crank shaft, means connecting the piston and shaft to rotate the shaft through one complete revolution while the piston is making four single strokes, said strokes being alternately two long and two short, and two means actuated by the crank shaft adapted to selectively operate said valves, one means operating the motor with a long firing stroke and the other with a short firing stroke, and mechanism to render either means operative.

23. In an internal combustion motor of the four-cycle type, in combination, a slidably mounted piston, valves for controlling the admission and exhaust to the motor, a rotatably mounted crank shaft, means connecting the piston and shaft to rotate the shaft through one complete revolution while the piston is making four single strokes, said strokes being alternately two long and two short, and two means actuated by the crank shaft adapted to selectively operate said valves, one means operating the motor with a long suction stroke and the other with a short suction stroke, and mechanism to render either means operative.

24. In an internal combustion motor of the four-cycle type, in combination, a slidably mounted piston, valves for controlling the admission and exhaust to the motor, a rotatably mounted crank shaft, means connecting the piston and shaft to rotate the shaft through one complete revolution while the piston is making four single strokes, said strokes being alternately two long and two short, and two means actuated by said crank shaft adapted to selectively operate said valves, one means operating the motor with a short suction stroke and long firing stroke, and the other means with a long suction stroke and short firing stroke, and mechanism to render either means operative.

25. In an internal combustion motor of the four-cycle type, in combination, a slidably mounted piston, valves for controlling the admission and exhaust of the motor, a rotatably mounted crank shaft, means connecting said piston and crank shaft to rotate the shaft through 360° while the piston makes four single strokes, said strokes being alternately two long and two short, and two sets of cams on said crank shaft for actuating said valves, one set adapted to actuate the motor with a long firing stroke and the other with a short firing stroke, (and means to render either set of cams operative.

26. In an internal combustion motor of the four-cycle type, in combination, a slidably mounted piston, valves for controlling the admission and exhaust of the motor, a rotatably mounted crank shaft, means connecting said piston and crank shaft to rotate the shaft through 360° while the piston makes four single strokes, said strokes being alternately two long and two short, and two sets of cams on said crank shaft for actuating said valves, one set adapted to actuate said motor with a long suction stroke and the other set with a short suction stroke, and means to render either set of same operative.

27. In an internal combustion motor of the four-cycle type, in combination, a slidably mounted piston, valves for controlling the admission and exhaust of the motor, a rotatably mounted crank shaft, means connecting said piston and crank shaft to rotate the shaft through 360° while the piston makes four single strokes, said strokes being alternately two long and two short, and two sets of cams on said crank shaft for actuating said valves, one set adapted to actuate said motor with a short suction stroke and long firing stroke and the other set with a long suction stroke and a short firing stroke, and means to render either set of cams operative.

28. In an internal combustion motor of the four-cycle type, in combination, two parallel spaced cylinders, pistons therein, a crank shaft rotatably mounted between said cylinders, means connecting one piston and said crank shaft to rotate the shaft through 360° while the piston makes four single strokes, said strokes being alternately two long and two short, said means including a rocker, a pitman connecting said piston and rocker, and a link connecting said rocker and crank shaft, and similar means connecting the other piston and said shaft.

29. In an internal combustion motor of the four-cycle type, in combination, two parallel spaced cylinders, pistons therein, a crank shaft rotatably mounted between said cylinders, means connecting one piston and said crank shaft to rotate the shaft through 360° while the piston makes four single strokes, said strokes being alternately two long and two short, similar means connecting the other piston and crank shaft, valves for controlling the admission and exhaust of said cylinders, two means for each cylinder actuated by said shaft adapted to selectively operate said valves, one means operating the motor with a long firing stroke and the other with a short firing stroke, and mechanism to render either means operative.

30. In an internal combustion motor of the four-cycle type, in combination, two parallel spaced cylinders, pistons therein, a crank shaft rotatably mounted between said cylinders, means connecting one piston and said crank shaft to rotate the shaft through 360° while the piston makes four single strokes, said strokes being alternately two long and two short, similar means connecting the other piston and crank shaft, valves for controlling the admission and exhaust of said cylinders, two means for each cylinder actuated by said shaft adapted to selectively operate said valves, one means operating the motor with a long suction stroke and the other with a short suction stroke and mechanism to render either means operative.

31. In an internal combustion motor of the four-cycle type, in combination, two parallel spaced cylinders, pistons therein, a crank shaft rotatably mounted between said cylinders, means connecting one piston and said crank shaft to rotate the shaft through 360° while the piston makes four single strokes, said strokes being alternately two long and two short, similar means connecting the other piston and crank shaft, valves for controlling the admission and exhaust of said cylinders, two means for each cylinder actuated by said shaft adapted to selectively operate said valves, one means operating the motor with a short suction and long firing strokes, and the other with long suction and short firing strokes, and mechanism to render either means operative.

32. In an internal combustion motor of the four-cycle type, in combination, two parallel spaced cylinders, pistons therein, a crank shaft rotatably mounted between said cylinders, means connecting one piston and said crank shaft to rotate the shaft through 360° while the piston makes four single strokes, said strokes being alternately two long and two short, similar means connecting the other piston and crank shaft, valves for controlling the admission and exhaust of said cylinders, two sets of cams on said crank shaft for each cylinder, one set operating the motor with a long firing stroke and the other with a short firing stroke, and mechanism to render either set operative.

33. In an internal combustion motor of the four-cycle type, in combination, two parallel spaced cylinders, pistons therein, a crank shaft rotatably mounted between said cylinders, means connecting one piston and said crank shaft to rotate the shaft through 360° while the piston makes four single strokes, said strokes being alternately two long and two short, similar means connecting the other piston and crank shaft, valves for controlling the admission and exhaust of said cylinders, two sets of cams on said crank shaft for each cylinder, one set operating the motor with a long suction stroke and the other with a short suction stroke, and mechanism to render either set operative.

34. In an internal combustion motor of the four-cycle type, in combination, two parallel spaced cylinders, pistons therein, a crank shaft rotatably mounted between said cylinders, means connecting one piston and said crank shaft to rotate the shaft through 360° while the piston makes four single strokes, said strokes being alternately two long and two short, similar means connecting the other piston and crank shaft, valves for controlling the admission and exhaust of said cylinders, two sets of cams on said crank shaft for each cylinder, one set operating the motor with short suction and long firing strokes and the other set with long suction and short firing strokes, and mechanism to render either set operative.

35. In an internal combustion motor of the four cycle type, in combination, a cylinder, a piston therein, a crank shaft, and means between said piston and crank shaft to rotate the crank shaft through 360° for four strokes of the piston comprising a rocker and connections from said rocker to the piston and shaft respectively, the relative positions of the rocker and shaft axes being such that the piston alternately makes two long strokes and two short strokes, the difference in length of strokes being all at one end.

36. In an internal combustion motor of the four cycle type, in combination, a cylinder, a piston therein, a crank shaft, and means between said piston and crank shaft to rotate the crank shaft through 360° for four strokes of the piston comprising a rocker and connections from said rocker to the piston and shaft respectively, the relative positions of the rocker and shaft axes being such that the piston alternately makes two long strokes and two short strokes, the difference in length of strokes being all at the end remote from the cylinder head.

37. In an internal combustion motor of the four cycle type, in combination, a cylinder, a piston therein, a crank shaft, and means between said piston and crank shaft to rotate the crank shaft through 360° for four strokes of the piston comprising a rocker and connections from said rocker to the piston and shaft respectively, the relative positions of the rocker and shaft axes being such that the piston alternately makes two long strokes and two short strokes, the difference in length of strokes being all at one end and the piston moving to the same position on its compression and exhaust strokes relative to the cylinder head.

38. In an internal combustion motor of the four cycle type, in combination, a cylinder, a piston therein, a crank shaft, and means between said piston and crank shaft to rotate the crank shaft through 360° for four strokes of the piston comprising a rocker and connections from said rocker to the piston and shaft respectively, the relative positions of the rocker and shaft axes being such that the piston starting from its position nearest the cylinder head moves on two short strokes returning to the same position relative to the head and then moves on two longer strokes returning to the same position relative to the head.

In testimony whereof I hereunto affix my signature.

LIONEL M. WOOLSON.